Patented Mar. 3, 1953

2,630,455

UNITED STATES PATENT OFFICE 2,630,455

CHLORO ALKYL ALKYLENE POLY AMINO ACIDS AND METHOD OF PRODUCING SAME

Frederick C. Bersworth, Verona, N. J.

No Drawing. Application June 29, 1951,
Serial No. 234,462

6 Claims. (Cl. 260—534)

1

This invention relates to organic chemistry and has for its object the provision of an improved method of producing chloro alkyl poly amino acids.

Another object is to provide new type chloro alkyl poly amino acids.

Still another object is to provide a method of preparing chloro alkyl poly amino acids which are useful intermediates in organic synthesis reactions and which are also of considerable utility as metal ion chelating agents in non-aqueous media.

Other objects will be apparent as the invention is more fully hereinafter disclosed.

In accordance with these objects I have discovered that chloro alkyl poly amino acids conforming to the generic structural formula given below may be produced in an economical and efficient manner by reacting an alkyl chlorobromide with an alkylene poly amine poly carboxylic acid and alkaline pH alcohol-water solution maintained at a substantially constant reaction temperature approximating 50° C., cooling and filtering the solution to remove the insoluble sodium bromide crystals present therein, distilling off the alcohol content of the solution at reduced pressures and at temperatures below 50° C., and then treating the alcohol-free solution with a carboxylate-type of cation-exchange resin of the hydrogen form with sufficient dilution to decrease amino acid absorption to a low order, filtering off the resin and recovering the chloro alkyl poly amino acid content of the solution by evaporation to dryness.

The chloro alkyl poly amino acids that may be prepared by the practice of this general chemical method conform to the following structural formula:

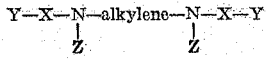

wherein: Z is one of the groups consisting of acetic and propionic acids; X is an aliphatic hydrocarbon group with or without an ether group; Y is halogen; and alkylene is one of the groups consisting of ethylene, trimethylene and propylene.

My investigations have demonstrated that chloro alkyl poly amino acids conforming to this structural formula are of great utility in organic synthesis reactions forming a large number of reaction products with a plurality of reactant compounds which heretofore have not been obtainable, many of which are of great value in the arts and industries.

2

The chloro alkyl poly amino acids conforming to this general structural formula also possess chelating properties towards metal ions in aqueous and non-aqueous solutions and have potentially a large field of utility as anti-oxidants and metal-ion stabilizers in non-aqueous solutions and mixtures of a large number of organic compounds.

As one specific embodiment of the present invention but not as a limitation thereof, I will first describe the above disclosed method invention as used in the production of N,N' di (2-chloroethyl) ethylene diamine diacetic acid conforming to the formula:

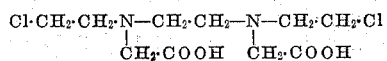

In producing this compound I proceed as follows:

In 500 ml. of water 176 g. of symmetrical ethylene diamine diacetic acid is dissolved, and 200 g. of 40% (by weight) sodium hydroxide solution is added. To the rapidly stirred solution, held at 50° C., is then added (slowly over a period of 4 hours) a solution of 287 g. of ethylene chlorobromide in 500 ml. of 95% ethanol. The rate of addition specified is slow enough to prevent appreciable overheating of the reaction mixture provided stirring is rapid and the reaction flask is immersed in a water bath held at the specified temperature. Overheating is undesirable since it greatly increases the percentage of polymeric products obtained and hence decreases the yield of the desired product. After addition is complete the reaction mixture is "finished off" by continuing the stirring and heating at 50° C. for four hours.

After cooling the solution, any crystallized sodium bromide is filtered off and the alcohol is removed by evaporation at reduced pressure (below 50° C.). The resulting pale yellow solution is then treated by a bath method with 50% more than the equivalent amount of a pure carboxylate type cation exchange resin (hydrogen form). The resin is stirred with the solution for one hour, first making up the solution to 3 liters with distilled water to decrease absorption of the amino acid by the resin. The solution is filtered and treated with a second (10% of the original) amount of resin for about 30 minutes in the cold. The resulting filtrate is strongly acid and nearly colorless. Evaporation to dryness results in crystallization of the mono to di hydrobromide of the desired product, N,N'-di(2-chloroethyl) ethylene diamine diacetic acid: The pure di hydrobromide may be prepared by omitting the step involving the filtration of NaBr. The hydrobromide may be crystallized from water to give a colorless crystalline salt which decompose above 200° C. at a rate depending on the rate of heating. Its elementary nitrogen analysis and acid-base titration curve in aqueous solution indicate it to be substantially pure.

This substance rearranges at elevated temperatures with evolution of halogen acid. Heating at or above the melting point in the absence of solvent, or heating at an elevated temperature in a non-aqueous solution results in the formation of a substance believed to have the following structure:

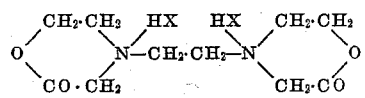

This is supported by the fact that on dissolving in water and neutralization it reverts to diethanol ethylene diamine diacetic acid:

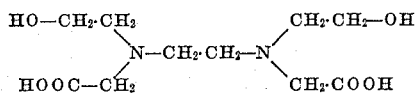

This compound has been described and prepared by a different method in my prior application Serial No. 26,726.

As a second specific embodiment of the present invention the preparation of a chloro alkyl ethylene diamine diacetic acid wherein the alkyl group X of the generic formula contains an ether group will be disclosed:

In producing this compound I proceed as follows:

One mole of the disodium salts of ethylene diamine diacetic acid is dissolved in 500 ml. of water and treated, with rapid stirring at 50° C., with 500 ml. of alcohol solution containing 5% in excess of 1 mole of 1-chloro-2-(β-bromoethyoxy)-ethane. The halide is added very slowly over a period of at least 4 hours and a total reaction time of about 10 hours is required to bring it to completion. The product is isolated from the reaction mixture by absorption on a strong cation exchanger (such as Dowex-50) in a suitable column. A 5% ammonia solution is used for elution from the amino acid at low temperatures and the final product obtained as a crystalline, colorless material upon evaporation of the elutriant solution at low temperature and under reduced pressure. Elementary analyses and potentiometric titration curves indicate the product to have the following structure:

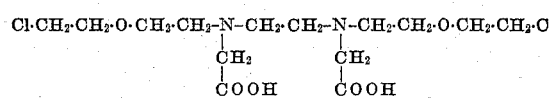

The yield is approximately 60% of the theoretical amount.

This compound is particularly useful or de-activation of non-aqueous phases such as: synthetic resins, rubber and the like.

As a third specific embodiment of the present invention the preparation of a chloro alkyl polyamino acid wherein the alkylene of the generic formula is trimethylene will be described.

In producing this compound I proceed as follows:

One mole of disodium salt of trimethylene diamine diacetic acid is treated with ethylene chlorobromide substantially as described in above example one. The reaction product in this case, however, is much more soluble than that of example one and the procedure described in example two for isolation of the product by ammonia dilution of a cation exchange column is much more satisfactory. It is important in the isolation procedure to keep the temperature low to prevent cyclization of the product. Upon evaporation of the elutrient solution a product conforming to the following formula:

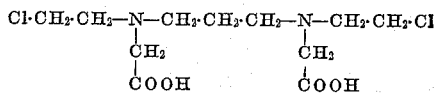

is obtained in crystalline form, in about 70% yield. This compound is particularly useful for the synthesis properties.

In the practice of the above disclosed method as generically and specifically described, I have found that substantial equivalents for ethylene chlorobromide in this reaction are propylene chlorobromide and trimethylene chlorobromide. These materials have about the same solubility as ethylene chlorobromide and the reactivity of the bromide is also of the same order of magnitude. As these properties would indicate I have found that these compounds may be used to replace ethylene chlorobromide in the above examples to give analogous products differing only in that the yield may be somewhat higher or lower as the case may be.

I have also found the most favorable reaction temperature is in the region of 50°–60° C. which combines as much as possible the desirable qualities of maximum reaction velocity with minimum yield of side products. At more elevated temperatures the required reaction time is lower but the chlorine tends to compete with the bromine in the nitrogen substitution reactions, thus increasing the number of by-products. At lower temperatures the number of by-products are also small but the reaction time becomes too long to be practical.

The reaction described in the above reactions is a general one and may be used to extend the length of the polyamine chain in a polyamino polycarboxylic acid having at least one free hydrogen on a terminal amino group, thus triethylene tetramine tetracetic acid may be converted to a higher amine or to other derivatives according to the following scheme:

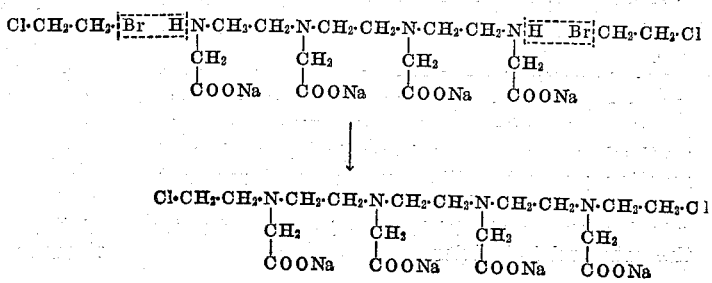

The above described method produces the chloro-compounds from which the other halide compounds may readily be prepared by double decomposition reaction with bromide and iodide compounds in aqueous solution with a removal of the chloride ions by ion exchange reaction with an anion exchange resin in accordance with methods well known in the art or by fractional crystallization of the bromo or iodo compounds from the reaction solution.

Whereas in the above specific examples of the invention I have given the practice followed in the forming of the symmetrical chloro alkyl alkylene poly amino acids, it is believed apparent that by using one-half of the amount of the alkyl chloro-bromide compound specified in each specific embodiment, the asymmetric or monohalide compound may be obtained and these compounds are intended to be included within the scope of this invention.

Also it is believed apparent that when the mono chloro alkyl compound is thus formed, the other X—Y group in the generic formula may be either H, acetic or propionic acid or any organic radical normally recognized as a substituent group for the amino hydrogen of an aliphatic poly amine, and such chloro-alkyl compounds are intended to be included within the scope of this invention.

It is further believed apparent that a large number of salts, complexes, chelate compounds and derivatives may be formed from the chloro alkyl alkylene poly amino acids hereinabove described without essential departure from the invention, many of which are of great utility in the art, and such salts, complexes, chelate compounds and derivatives are intended to be included within the scope of this invention.

It is believed apparent from the above disclosure that the method invention hereinabove described may be widely changed, varied and modified without essential departure therefrom and that a large number of chloro alkyl poly amino acids conforming to the generic structural formula given above may be prepared by the practice of the said method invention and all variations, modifications and departures from the method invention described above are contemplated as may fall within the scope of the appended claims.

This invention insofar as it relates to compounds conforming to the generic structural formula given is a continuation-in-part application of my application Serial No. 26,726, filed May 12, 1948.

What I claim is:

1. The method of producing chloroalkyl poly amino acids which comprises reacting an alkyl chloro-bromide with an alkylene poly amine polycarboxylic acid in alkaline pH solution maintained at a substantially constant reaction temperature approximating 50° C., cooling and filtering the reaction solution to remove the insolubles present therein, vacuum-distilling the filtered solution at temperatures below 50° C. to remove the alcohol therefrom, diluting the solution and treating the diluted solution with a cation exchange resin to convert the amino acid salts therein to amino acid, separating the acid solution from the resin and evaporating off the water of solution to recover the amino acid content of the solution.

2. Chloroalkyl polyamino acids conforming to the following structure:

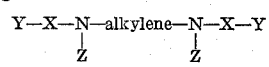

wherein Z is a member of the group consisting of $CH_2 \cdot COOH$ and $CH_2 \cdot CH_2 \cdot COOH$; X is a member of the group consisting of lower alkylene and lower alkylene in which the alkylene chain is interrupted by oxygen; Y is a member of the group consisting of chlorine and bromine; and alkylene is a member of the group consisting of $CH_2 \cdot CH_2$; $CH_2 \cdot CH \cdot CH_3$; and $CH_2 \cdot CH_2 \cdot CH_2$.

3. The compound N,N' - di - (2 - chloroethyl) ethylene diamine diacetic acid conforming to the formula:

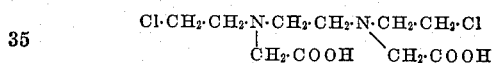

4. The compound N,N' - di(2 - chloroethoxyethyl) ethylene diamine diacetic acid conforming to the formula:

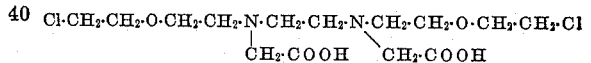

5. The compound N,N' - di - (2 - chloroethyl) trimethylene diamine diacetic acid conforming to the formula:

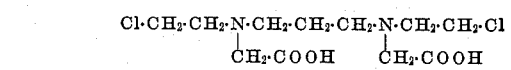

6. The compound N,N'''-di-(2-chloroethyl) trimethylene tetramine -N,N', N'', N'''-tetracetic acid conforming to the formula:

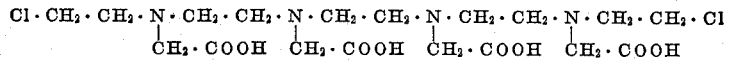

FREDERICK C. BERSWORTH.

No references cited.